US011818406B2

(12) United States Patent
Muthiah

(10) Patent No.: US 11,818,406 B2
(45) Date of Patent: Nov. 14, 2023

(54) DATA STORAGE SERVER WITH ON-DEMAND MEDIA SUBTITLES

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 16/936,780

(22) Filed: Jul. 23, 2020

(65) Prior Publication Data

US 2022/0030286 A1 Jan. 27, 2022

(51) Int. Cl.
*H04N 7/16* (2011.01)
*H04N 21/235* (2011.01)
*H04L 67/1097* (2022.01)
*H04N 21/232* (2011.01)
*H04N 21/4722* (2011.01)
*G10L 21/10* (2013.01)
*H04N 21/233* (2011.01)
*H04N 21/439* (2011.01)
*G10L 15/26* (2006.01)
*H04N 21/488* (2011.01)

(52) U.S. Cl.
CPC .......... *H04N 21/235* (2013.01); *G10L 15/26* (2013.01); *G10L 21/10* (2013.01); *H04L 67/1097* (2013.01); *H04N 21/232* (2013.01); *H04N 21/233* (2013.01); *H04N 21/439* (2013.01); *H04N 21/4722* (2013.01); *H04N 21/4884* (2013.01)

(58) Field of Classification Search
CPC ............... H04N 21/235; H04N 21/233; H04N 21/4722; H04N 21/232; H04N 21/439; H04N 21/4884; H04N 21/234336; H04N 21/6581; H04N 21/6582; H04N 21/8133; H04L 67/1097; G10L 15/26; G10L 21/10
See application file for complete search history.

(56) References Cited

U.S. PATENT DOCUMENTS

| 6,768,661 | B2 | 7/2004 | Vyvoda et al. |
| 7,539,619 | B1 * | 5/2009 | Seligman ................ G10L 15/30 704/277 |
| 8,725,940 | B2 | 5/2014 | Grube et al. |

(Continued)

OTHER PUBLICATIONS

"Use automatic captioning," YouTube Help, https://support.google.com/youtube/answer/6373554?hl=en.

(Continued)

*Primary Examiner* — Annan Q Shang
(74) *Attorney, Agent, or Firm* — Chang & Hale LLP

(57) ABSTRACT

A network-attached storage device (NAS) includes a non-volatile memory module storing a media stream, a network interface, and control circuitry coupled to the non-volatile memory module and to the network interface and configured to connect to a client over a network connection using the network interface, receive a request for the media stream from the client, determine subtitle preferences associated with the request for the media stream, access an audio stream associated with the media stream, generate subtitles based on the audio stream, and send a transport stream to the client over the network connection, the transport stream including the media stream and the subtitles.

20 Claims, 7 Drawing Sheets

(56) References Cited

U.S. PATENT DOCUMENTS

| | | | | |
|---|---|---|---|---|
| 8,752,113 | B1* | 6/2014 | Good | H04N 21/2662 |
| | | | | 725/116 |
| 9,446,518 | B1* | 9/2016 | Blankespoor | B62D 57/00 |
| 9,456,170 | B1* | 9/2016 | Miller | G06K 9/72 |
| 9,552,354 | B1* | 1/2017 | Seligman | G06F 40/51 |
| 10,007,442 | B2 | 6/2018 | Hahn et al. | |
| 10,228,854 | B2 | 3/2019 | Romanovsky et al. | |
| 2006/0143655 | A1* | 6/2006 | Ellis | H04N 21/4821 |
| | | | | 725/47 |
| 2007/0285566 | A1* | 12/2007 | Lee | H04N 21/4348 |
| | | | | 348/465 |
| 2007/0300250 | A1* | 12/2007 | Smith | H04N 21/4348 |
| | | | | 725/135 |
| 2008/0046488 | A1* | 2/2008 | Woodley | G06F 16/7844 |
| 2008/0175564 | A1* | 7/2008 | Lin | H04N 21/4884 |
| | | | | 386/245 |
| 2009/0083279 | A1* | 3/2009 | Hasek | H04N 21/21815 |
| 2010/0228546 | A1* | 9/2010 | Dingier | H04M 3/42391 |
| | | | | 704/235 |
| 2010/0333148 | A1* | 12/2010 | Musha | H04N 21/2401 |
| | | | | 725/81 |
| 2013/0287364 | A1* | 10/2013 | Katsumata | H04N 5/44543 |
| | | | | 386/239 |
| 2013/0290892 | A1* | 10/2013 | Basapur | H04N 21/4882 |
| | | | | 715/772 |
| 2018/0160069 | A1* | 6/2018 | Burger | H04N 21/42204 |
| 2018/0189249 | A1* | 7/2018 | Berman | G06F 40/58 |
| 2019/0028522 | A1* | 1/2019 | Kumar | H04N 21/2355 |
| 2020/0380073 | A1* | 12/2020 | Hild | G10L 21/0364 |
| 2021/0014575 | A1* | 1/2021 | Selfors | G09B 19/06 |
| 2021/0097143 | A1* | 4/2021 | Dozier, III | G06F 40/42 |

OTHER PUBLICATIONS

Transcribe, https://transcribe.wreally.com/?gclid=EAlalQobChMIx6GVg9Dm6QIVJRvnCh0wig_aEAAYAIAAEgJoIPD_BwE.

"SubRip," Wikipedia, https://en.wikipedia.org/wiki/SubRip.

"Subtitles," Wikipedia, https://en.wikipedia.org/wiki/Subtitles.

* cited by examiner

DATA STORAGE SERVER WITH ON-DEMAND MEDIA SUBTITLES

BACKGROUND

Field

This disclosure relates to data storage systems. More particularly, the disclosure relates to systems and methods for implementing internal on-demand subtitle generation in data storage servers/devices.

Description of Related Art

A storage system can be used to store media content data streams. For example, media content streams can be stored in memory in the Moving Picture Experts Group Transport Stream (MPEG-TS) format. Such media streams can include certain elementary stream constituents, including one or more video streams, audio streams, and possibly subtitle streams. Subtitle elementary streams of native media content streams are generally limited to a finite number of languages and/or types.

BRIEF DESCRIPTION OF THE DRAWINGS

Various embodiments are depicted in the accompanying drawings for illustrative purposes and should in no way be interpreted as limiting the scope of this disclosure. In addition, various features of different disclosed embodiments can be combined to form additional embodiments, which are part of this disclosure.

DETAILED DESCRIPTION

Figure 1:
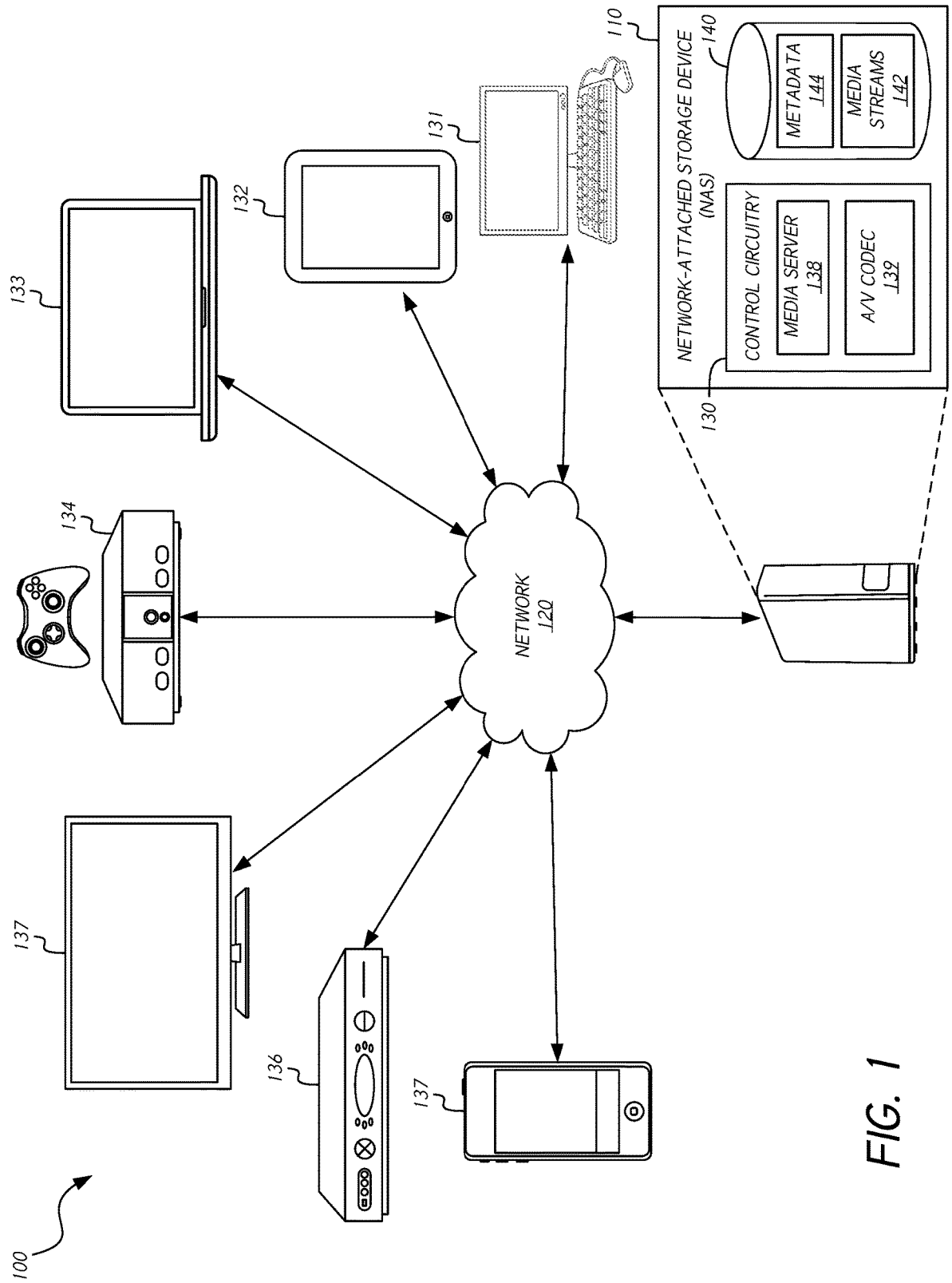
FIG. 1 is a diagram of a network-attached data storage system in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

With respect to media content consumption by consumers, language limitations of the consumer/user can limit media viewership. Subtitles in media content represent text derived from either a transcript or screenplay of the dialogue or commentary in the media content, such as a film, television program, videogame, and/or other video content. Generally, subtitled may be displayed on/over the bottom of the video frame corresponding to the timestamp of the subtitle. Subtitles can be of the form of written translation of the dialogue in a foreign language or a written rendering of dialogue in the same language, with or without added information to help viewers who are deaf or hard of hearing to follow the dialogue, or people who cannot understand spoken dialogue or have accent-recognition problems.

According to some solutions, subtitles are available as native elementary subtitle streams of certain media content streams. However, such native subtitle streams may be undesirably limited and not flexible in some situations. In particular, such native subtitle streams may not suit all end-users with respect to language and/or other parameter(s). Furthermore, use of client applications that are configured to add subtitles to stored media content streams may require that the whole content of the media stream be retrieved from the relevant data storage server/device and written back to the data storage server/device. Considering that more than 80% of stored data is generally media content, the requirement of transferring media content items back and forth between the client and the data storage server can impose a resource burden and inefficiency with respect to client-side subtitle generation solutions.

Disclosed herein are systems, devices, and methods for implementing in-house/internal subtitle creation and/or integration for/with an internally stored native media content/data stream by a data storage server/device, such as a network-attached storage device (NAS). Such solutions of the present disclosure can allow for on-demand subtitle requests from a client, wherein the resultant transport stream, when decoded, can be played by the playback system along with the newly-generated subtitles received from the data storage server/device in response to the on-demand subtitle request from the client. The resulting transport stream, with the new subtitle file/text, may be playable as specified under the Moving Picture Experts Group (MPEG) broadcast standard. By enabling internal subtitle generation in a data storage device/server, the user experience may be enhanced.

Although certain embodiments are disclosed herein in the context of data storage servers, and in particular network-attached storage devices (NAS) and systems, it should be understood that the principles disclosed herein may be applicable in other data storage environments wherein on-demand subtitle provision is desired.

In some implementations, the present disclosure relates to a network-attached storage device (NAS) comprising a non-volatile memory module storing a media stream, a network interface, and control circuitry coupled to the non-volatile memory module and to the network interface and configured to connect to a client over a network connection using the network interface, receive a request for the media stream from the client, determine subtitle preferences associated with the request for the media stream, access an audio stream associated with the media stream, generate subtitles based on the audio stream, and send a transport stream to the client over the network connection, the transport stream including the media stream and the subtitles.

The control circuitry may be further configured to generate a subtitle file including a payload comprising the subtitles and timestamp data associated with the subtitles. For example, the transport stream can include the subtitle file. In the transport stream, the subtitle file can be separate from the media stream. In some embodiments, in the transport stream, the subtitle file is part of the media stream. The subtitle file can be, for example, a SubRip Subtitle (SRT) file.

In some embodiments, the media stream is stored in a first region of the non-volatile memory module, first region having a first endurance designation, and the control circuitry is further configured to store the subtitle file in a second region of the non-volatile memory module, the second region having a second endurance designation that is different from the first endurance designation. For example, the first region may correspond to a first namespace and the second region may correspond to a second namespace.

The control circuitry may be further configured to append the subtitles to the media stream. In some embodiments, the media stream includes a native subtitle stream. For example, the control circuitry may be further configured to add the subtitles to the native subtitle stream.

In some implementations, the present disclosure relates to a method of generating on-demand subtitles. The method comprises receiving a request for a media stream stored in a non-volatile data store, receiving an on-demand subtitle request associated with the request for the media stream, retrieving an audio stream associated with the media stream from the non-volatile data store, generating subtitles based on the audio stream, and transmitting a transport stream including the media stream and the subtitles.

The method may further comprise generating a new subtitle file including the subtitles and timestamp data associated with the subtitles. For example, the transport stream can include the new subtitle file. The method may further comprise storing the new subtitle file in the non-volatile data store. For example, the new subtitle file can be stored in a separate region of the non-volatile data store than the media stream. In some embodiments, the method further comprises garbage collecting the new subtitle file without garbage collecting the media stream.

In some implementations, the present disclosure relates to a data storage device comprising non-volatile data storage media storing a media stream, means for communicatively coupling to a host system, and controller means coupled to the non-volatile data storage media and to the means for communicatively coupling, wherein the controller means being configured to receive a request for the media stream from the host system using the means for communicatively coupling, receive an on-demand subtitle request associated with the request for the media stream, using a means for transcribing audio data, generate subtitles from an audio stream associated with the media stream, and transmit a transport stream to the host system, the transport stream including the media stream and the subtitles.

The controller means can be further configured to generate a subtitle file including the subtitles and timestamp data associated with the subtitles. In some embodiments, the controller means is further configured to store the subtitle file in a region of the non-volatile data storage media separate from the media stream.

Network-Attached Storage

In some embodiments, a network attached storage device and/or client device, may be configured to implement an application programming interface that allows for the requesting and provision of on-demand subtitles for a given media content item. Certain data storage systems configured to provide internal, on-demand subtitle provision in accordance with embodiments of the present disclosure may include a data storage server connected to a client. For example, a data storage system may include a home-storage NAS device, on which a user can store his or her video/audio content and get access to the same using certain software clients provided in connection with the NAS and/or compatible therewith.

Network-attached storage (NAS) drives/systems can provide file-level, or object-level, data storage over a computer network, wherein access to the stored data is accessible to one or more clients. Although certain embodiments are disclosed herein in the context of streams, files, file servers, file systems, and other file-level references, it should be understood that such references, as used herein, may refer to object-level data, or any other type of data structure, depending on the implementation.

A NAS may include hardware, software, or a combination of such elements, configured such that the NAS operates as a media/file server. FIG. 1 is a diagram illustrating an embodiment of a NAS system 100, in which a network-attached storage device (NAS) 110 is communicatively coupled to one or more client devices over a network 120. The NAS 110 may provide file-based, or object-based, data storage services to devices coupled to the network 120. Types of client devices that may have access to the NAS 110 can include phones 137, such as smartphones, cable set-top boxes 136, smart TV's 135, video game consoles 134, laptop computers 133, tablet computers 132, desktop computers 131, wearable computers (not shown) and/or other network-connected computing devices. The network 120 may be a local area network (LAN), a wide area network (WAN) (e.g., the Internet), or other type of computer network, and the connections between the various client components of the system 100 and the network 120 may be either wired or wireless.

While certain embodiments are described herein in the context of NAS devices/systems, it should be understood that references herein to NAS's may refer to other types of data storage devices/systems, such as any type of computer device implementing software allowing for data storage access over a network or other connection. Furthermore, some embodiments disclosed herein may be implemented using data storage device connections that are not over a network, but rather a direct client/server connection.

In certain embodiments, the NAS 110 may be configurable over the network 120 by a client device interface, such as a web browser of a mobile or desktop computing device. An operating system (e.g., a relatively low-level operating system, such as FreeNAS) may be implemented in the NAS 110 by a control circuitry 130 thereof. The NAS 110 may provide access to files 142, such as video files, using one or more network file-sharing protocols, such as Network File System (NFS), Server Message Block (SMB/CIFS), Apple Filing Protocol (AFP), or the like. The NAS 110 may comprise a data store 140 for storing the user data (e.g., media streams) 142, as well as certain metadata 144, such as system tables or the like, and/or other types of data. The data store 140 may comprise one or more non-volatile memory devices or modules and may include any type of data storage media (e.g., solid-state, magnetic).

Although certain embodiments are disclosed herein in the context of video content streams and video content, it should be understood that principles disclosed herein may be applicable to other types of data containers or content streams. Storage access clients may be mobile clients, desktop clients, and/or web clients. Among other types of user content, users may store video content of various kinds on a NAS. It may be desirable for users, with the assistance of certain client applications, to have the ability to play videos stored on a NAS. That is, the NAS may advantageously provide video playback to client devices as an integral feature of the device. The terms "video content" and "content" are used here and according to their broad and/ordinary meanings and may be used to describe a video file or container, and/or video stream content contained within a file or container.

The stored user data may include, for example, audio, video, still images, voice, text, or other form of media. Media content stored in the data store 140, such as media streams 142, may be embodied in containers, and may be in a single uncompressed container format for each media type. For example, audio files may be archived in data storage 14 as PCM (pulse code modulation) format, .wav or .aiff files, or as BWF (broadcasting wave format). Still images may be stored in FITS (Flexible Image Transport System) or TIFF (Tagged Image File Format). Video may be stored in Audio Video Interleave (AVI), ANIM, Advanced Systems Format (ASF), DVR-MS, Interchange File Format (IFF), Quick-Time multimedia file format (MOV), MPEG-1, MPEG-2, MP4 or the like.

The NAS 110 may be configured to implement encryption for the media streams 142 stored in the data store 140. For example, the NAS 110 may implement Transport Layer Security (TLS), Secure Sockets Layer (SSL), and/or Advanced Encryption Standard (AES) keys (e.g., 256-bit, 128-bit, etc.) to protect files in rest and/or in motion. The NAS 110 may further be configured to implement one or more additional security features, such as user verification, forward secrecy, and/or the like.

The NAS 110 includes a media server 138 configured to serve media stream content 142, such as transcoded video file content, to clients connected thereto and authorized to use such content. With respect to playback of the media content 142 stored in the NAS 110, certain challenges may be associated with playback by a particular user of such content. For example, the media streams 142 may comprise various video file containers and/or codecs. The term "codec" is used herein and according to its broad and/ordinary meaning, and may be used to describe a device or computer program for encoding or decoding a digital data stream or signal, such as a video stream, audio stream, or the like. The control circuitry 130 of the NAS 110 may implement one or more video and/or audio codecs to encode data streams for transmission to the various clients, possibly in encrypted form. The clients may comprise decoder functionality for reversing the encoding for playback or editing. The term "control circuitry" is used herein according to its broad and ordinary meaning, and may refer to any collection of processors, processing circuitry, processing modules/units, chips, dies (e.g., semiconductor dies including come or more active and/or passive devices and/or connectivity circuitry), microprocessors, micro-controllers, digital signal processors, microcomputers, central processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry referenced herein may further comprise one or more storage devices, which may be embodied in a single memory device, a plurality of memory devices, and/or embedded circuitry of a device. Such data storage may comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware and/or software state machine, analog circuitry, digital circuitry, and/or logic circuitry, data storage device(s)/register(s) storing any associated operational instructions may be embedded within, or external to, the circuitry comprising the state machine, analog circuitry, digital circuitry, and/or logic circuitry. Any types of control circuitry or controllers disclosed herein may be considered types of controller means that may be implemented to perform certain functionality associated with embodiments of the present disclosure.

Host/Storage Server Configuration

Figure 2A:
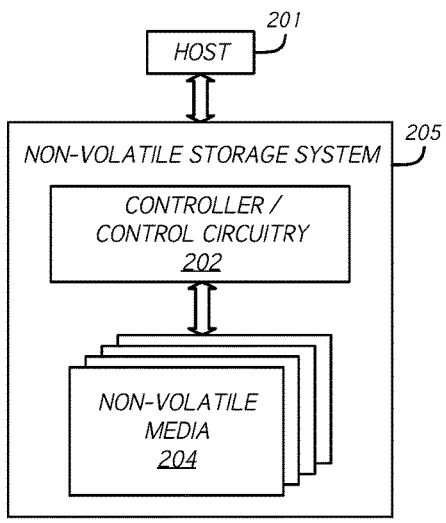
FIG. 2A is a block diagram of a non-volatile data storage system in accordance with one or more embodiments.
Figure 2B:
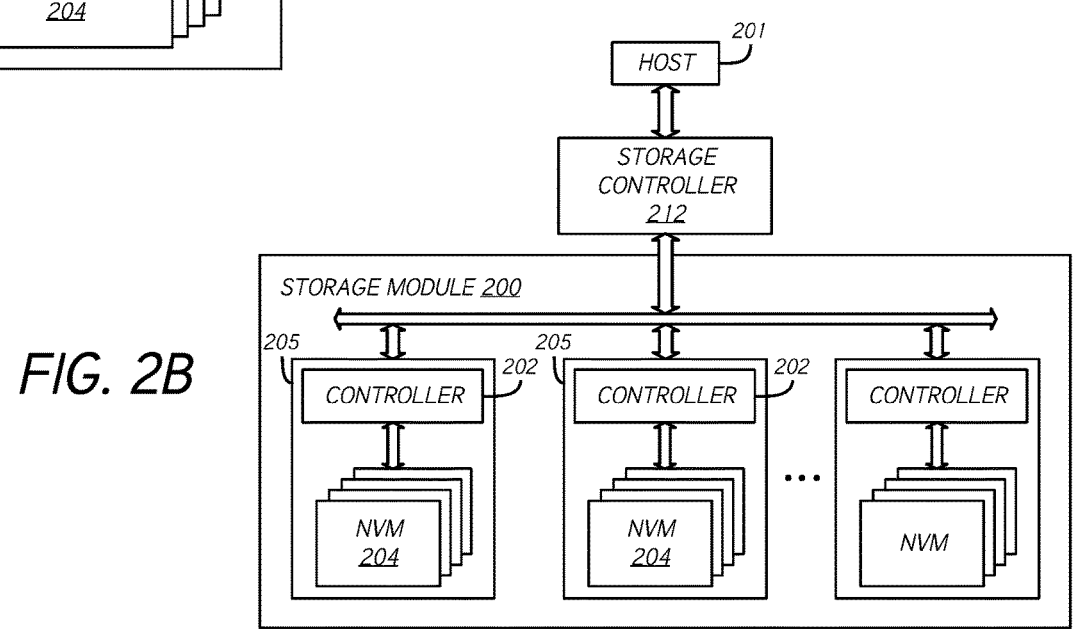
FIG. 2B is a block diagram illustrating a data storage module in accordance with one or more embodiments.
Figure 2C:
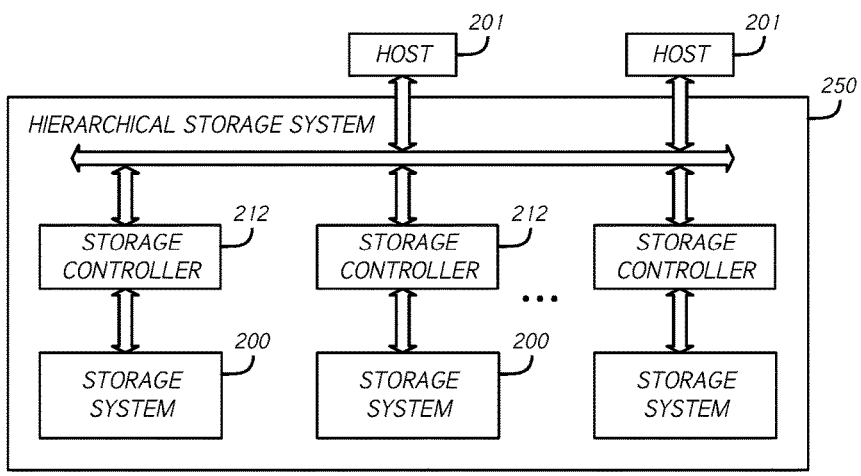
FIG. 2C is a block diagram illustrating a hierarchical data storage system in accordance with one or more embodiments.

Storage systems suitable for use in implementing aspects of embodiments of the present disclosure are shown in FIGS. 2A-2C. FIG. 2A is a block diagram illustrating a non-volatile storage system 205 according to one or more embodiments of the present disclosure. Referring to FIG. 2A, the non-volatile storage system 205 includes a controller 102 and non-volatile media 204 that may be made up of one or more non-volatile memory die. As used herein, the term die refers to the collection of non-volatile memory cells, and associated circuitry (e.g., control circuitry) for managing the physical operation of the non-volatile memory cells, that are formed on a single semiconductor substrate. The control circuitry 202, which may be considered, and is referred to herein as such for convenience as an example implementation, a "controller" as understood by those having ordinary skill in the art and described in certain detail below, interfaces with a host system 201 and transmits command sequences for read, program, and erase operations to non-volatile data storage media 204.

The controller 202 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 202 can be configured with hardware and/or firmware to perform the various functions described below and shown in the flow diagrams. Also, some of the components described as being internal to the controller can also be stored external to the controller, and other components can be used. Additionally, the phrase "communicatively coupled" with/to could mean directly in communication with or indirectly (wired or wireless) in communication with through one or more components, which may or may not be shown or described herein.

As used herein, a non-volatile memory controller is a device and/or control circuitry that manages data stored in non-volatile media and is configured to communicate with a host, such as a computer or electronic device. A non-volatile memory controller can have various functionality in addition to the specific functionality described herein. For example, non-volatile memory controllers disclosed herein can be configured to format communicatively coupled non-volatile media to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from, or write data to, the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing Writes to avoid wearing out specific blocks of memory that would otherwise be repeatedly written to) and garbage collection (after a block is full, moving only the valid pages of data to a new block, so the full block can be erased and reused).

The non-volatile media 204 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 202 and non-volatile media 204 may be any suitable flash interface, such as Toggle Mode 200, 400, or 800. In some embodiments, the storage system 205 may be a card-based system, such as a secure digital (SD) or a micro secure digital (micro-SD) card. In an alternate embodiment, storage system 205 may be part of an embedded storage system.

The non-volatile storage system 205 (sometimes referred to herein as a storage module) can include a single channel between the controller 202 and the non-volatile media 204. However, the subject matter described herein is not limited to having a single memory channel. For example, in some storage system architectures (such as the ones shown in FIGS. 2B and 2C), 2, 4, 8 or more memory channels may exist between a controller and non-volatile media, depending on controller capabilities. In any of the embodiments described herein, more than a single channel may exist between the controller and the non-volatile media, even if a single channel is shown in the drawings. In FIGS. 2A-2C, certain reference numbers are reused as a matter of convenience for devices and modules having features that are similar in one or more respects. However, as with any of the embodiments disclosed herein, re-use of common reference numbers in the drawings does not necessarily indicate that such features, devices, components, or modules are identical.

FIG. 2B illustrates a storage module 200 that includes a plurality of non-volatile storage systems 205. As such, storage module 200 may include a storage controller 212 that interfaces with a host 201 and with the storage module 200, which includes a plurality of non-volatile storage systems 205. The interface between storage controller 212 and the non-volatile storage systems 205 may be a bus interface, such as a serial advanced technology attachment (SATA), peripheral component interconnect express (PCIe) interface, or double-data-rate (DDR) interface. In some embodiments, the storage module 200 may be a solid state drive (SSD), or non-volatile dual in-line memory module (NVDIMM), such as may be found in server PC or portable computing devices, such as laptop computers, and tablet computers.

FIG. 2C is a block diagram illustrating a hierarchical storage system 250. The hierarchical storage system 250 includes a plurality of storage controllers 212, each of which controls a respective storage system/module 200. Host systems 201 may access data storage devices within the storage system via a bus interface. In some embodiments, the bus interface may be a Non-Volatile Memory Express (NVMe) or Fibre Channel over Ethernet (FCoE) interface. In some embodiments, the system illustrated in FIG. 2C may be a rack-mountable mass storage system that is accessible by multiple host computers, such as may be found in a data center or other locations where mass storage is needed.

Figure 3:
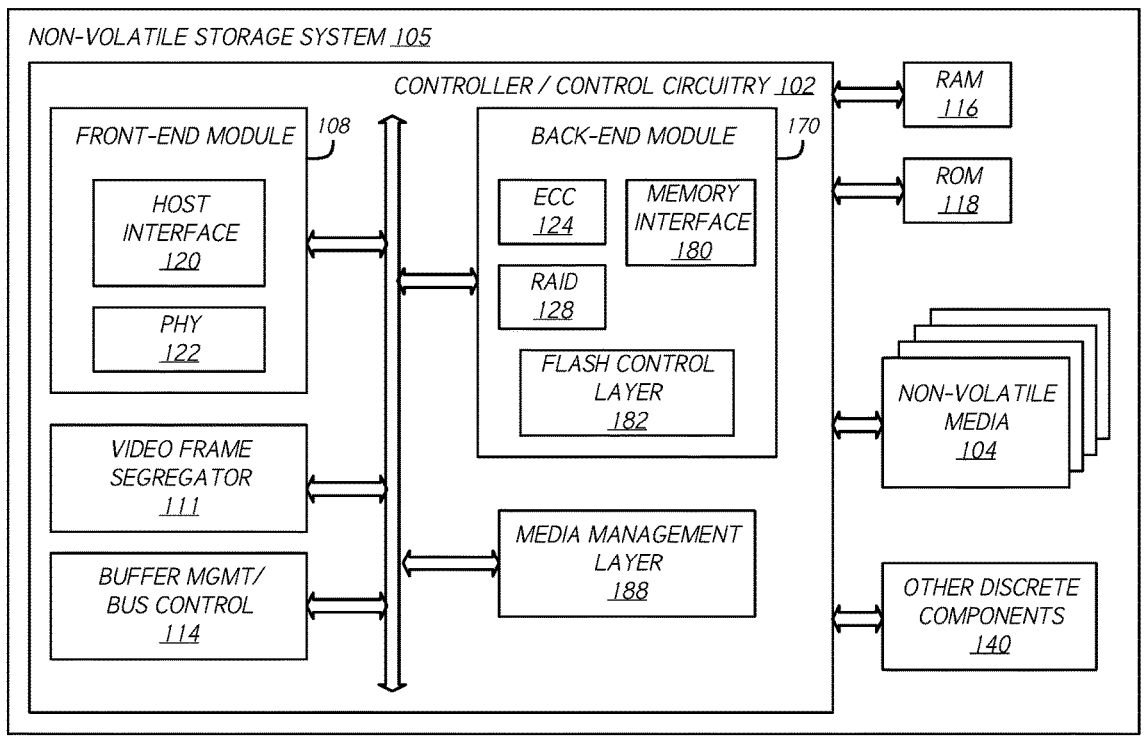
FIG. 3 is a block diagram of a non-volatile data storage system in accordance with one or more embodiments.

FIG. 3 is a block diagram illustrating components of a controller 102 in more detail. The controller 102 includes a front end module 108 that is configured to interface with a host (not shown), a back end module 170 that is configured to interface with non-volatile media 104 (e.g., one or more non-volatile memory die), and various other modules/circuitry that are configured to perform various functions. Control circuitry "modules" described herein may take the form of a packaged functional hardware unit designed for use with other components, a portion of a program code (e.g., software or firmware) executable by a (micro)processor or processing circuitry that performs a particular function, or a self-contained hardware or software component that interfaces with a larger system, for example. Modules of the controller 102 may include a video frame segregator 111, which can be implemented in hardware or software/firmware to extract various video frames from a video stream, wherein subtitles can be superimposed on such video frames in connection with some embodiments disclosed herein. The video frame segregator 111 can be configured to perform certain of the algorithms and methods discussed below and shown in the attached drawings.

Referring again to modules of the controller 102, a buffer manager/bus controller 114 configured to manage buffers in random access memory (RAM) 116 and control the internal bus arbitration of the controller 102. A read only memory (ROM) 118 may be includes that stores system boot code. Although illustrated in FIG. 3 as located separately from the controller 102, in other embodiments one or both of the RAM 116 and ROM 118 may be located within the controller 102. In yet other embodiments, portions of RAM and ROM may be located both within the controller 102 and outside the controller.

The front end module 108 can include a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

The back end module 170 may include an error correction code (ECC) engine 124 that is configured to encode data bytes received from the host, and decodes and error-correct data bytes read from the non-volatile media 104. A command sequencer 126 may be included that is configured to generate command sequences, such as program and erase command sequences, to be transmitted to the non-volatile media 104. In some embodiments, a RAID (Redundant Array of Independent Drives) module 128 is included that is configured to manage generation of RAID parity and recovery of failed data. The RAID parity may be used as an additional level of integrity protection for the data being written into the media 104. In some cases, the RAID module 128 may be a part of the ECC engine 124. A memory interface 180 may be included that is configured to provide the command sequences to non-volatile media 104 and receive status information from the non-volatile media 104. In some embodiments, the memory interface 180 may be a double data rate (DDR) interface, such as a Toggle Mode 200, 400, or 800 interface. A flash control layer 132 may be included that is configured to control the overall operation of back end module 170.

The storage system 100 can also include certain other discrete components 160, such as external electrical interfaces, external RAM, resistors, capacitors, or other components that may interface with controller 102. In some embodiments, one or more of the physical layer interface 122, RAID module 128, media management layer 138 and buffer management/bus controller 114 can be considered optional components that are not necessary in the controller 102.

Figure 4:
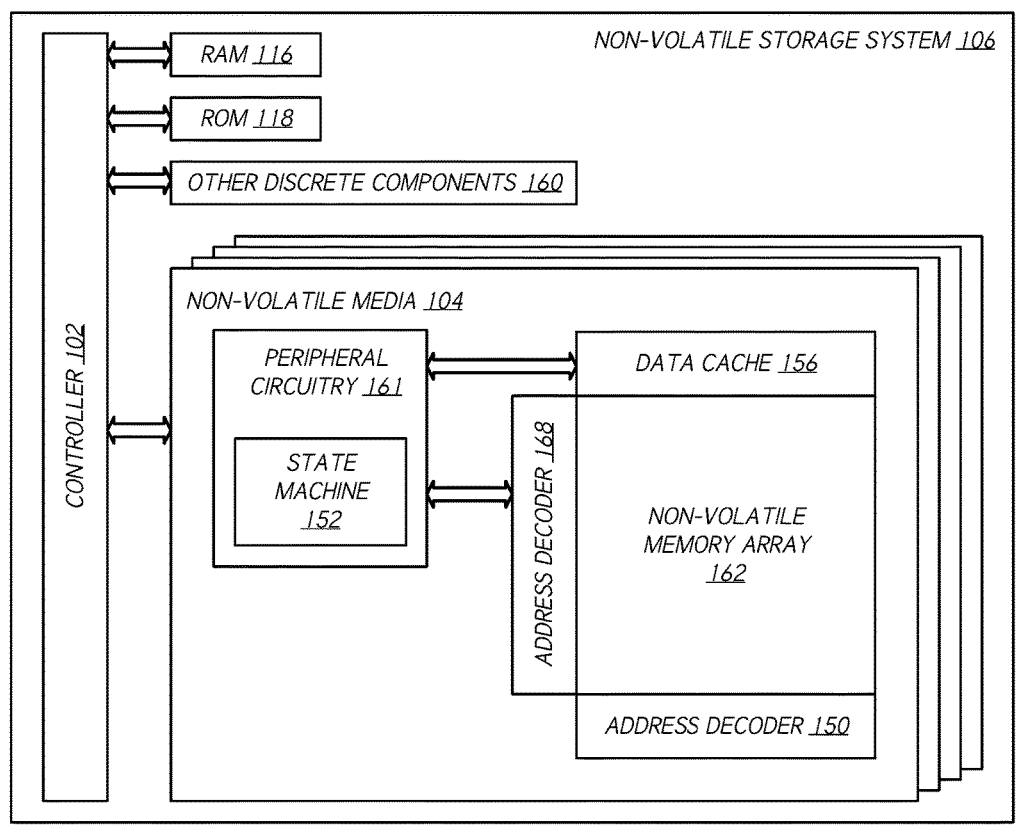
FIG. 4 is a block diagram of a non-volatile data storage system in accordance with one or more embodiments.

FIG. 4 is a block diagram illustrating components of the non-volatile media (e.g., non-volatile memory die) in more detail. The non-volatile media 104 can include certain peripheral circuitry 141 and one or more non-volatile memory arrays 162. The non-volatile memory array 162 can include non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. The non-volatile media 104 can further include a data cache 156 that is configured to cache data written and/or read to/from the non-volatile memory array 162. The peripheral circuitry 141 can include a state machine 152 that provides status information to the controller 102.

Returning again to FIG. 3, the flash control layer 132 (which may be referred to herein as the flash translation layer (FTL) or, more generally, the "media management layer," as the memory may not be flash) can be configured to handle flash errors and/or interface with the host. In particular, the FTL, which may be implemented in firmware code, may be responsible for the internals of memory management and/or configured to translate writes from the host into writes to the non-volatile media 104. The FTL may be needed due to limited endurance characteristics of the media 104, wherein the media 104 may be configured to only be written in multiples of pages, and/or may not be written unless it is erased together as a block or other areas or region of the media. These limitations of the media 104 may not be visible to the host. Accordingly, the FTL can be configured to translate writes from host into writes to the memory 104.

The FTL may include a logical-to-physical (L2P) address map and allotted cache memory. In this way, the FTL can be configured to translate logical block addresses ("LBAs") from the host to physical addresses in the media 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

On-Demand Subtitle Provision by Data Storage Device/Server

Figure 5:
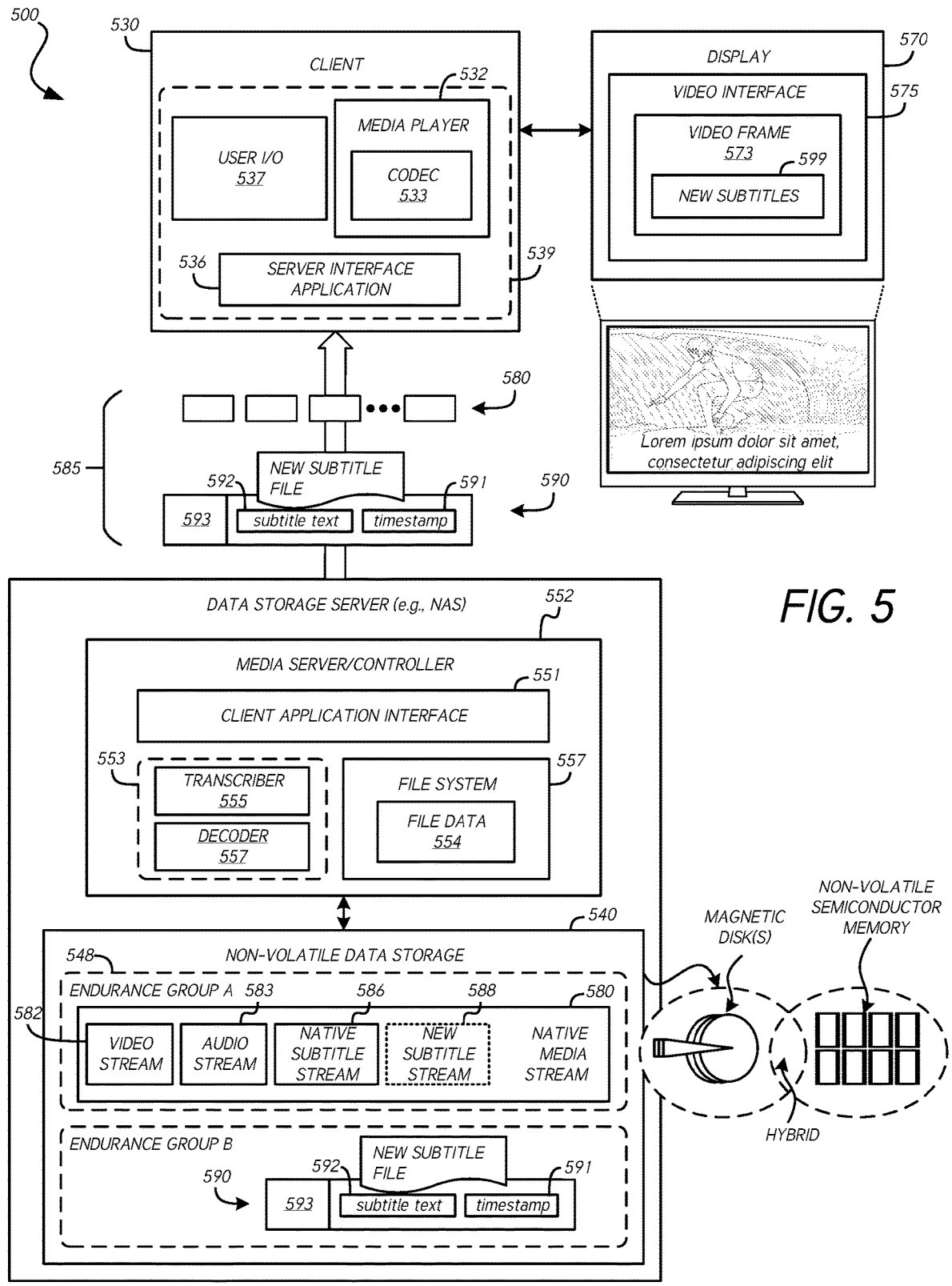
FIG. 5 is a block diagram of a data storage server system in accordance with one or more embodiments.

FIG. 5 is a block diagram illustrating a data storage server system 500, such as a network-attached storage (NAS) system, according to an example embodiment. The system 500 includes a data storage server 550, which may represent an embodiment of the NAS 110 of FIG. 1. Although the storage server 550 may represent any type of data storage server device or system, the storage server 550 may be described below in certain contexts as a NAS for illustration purposes. The data storage server (e.g., NAS) 550 may include certain control circuitry or components configured to implement a media server 552. For example, the illustrated embodiment of FIG. 2 comprises control circuitry functional modules and components including the file server 552, client application interface 551, subtitle management circuitry 553, and file system 557. The control circuitry of the various illustrated functional module may be implemented as a combination of one or more processors, chips/dies, field-programmable gate arrays (FPGA), data and/or power transmission channels or busses, volatile and/or non-volatile memory modules, stored code, and/or other components. Furthermore, although the control circuitry of the data storage server 550 is illustrated as various separate modules, it should be understood that the functionality represented thereby may be implemented using any configuration of modules or control circuitry.

The data storage server 550 includes non-volatile data storage 540. The data storage 540 may comprise one or more disks, wherein the NAS 550 further comprises one or more heads actuated radially over the disk(s), and a spindle motor for rotating the disk(s). Alternatively or in addition to magnetic (or optical) rotating media, the non-volatile data storage 540 may comprise solid-state memory and/or other non-volatile memory. In certain embodiments, the data storage server 550 may comprise one or more hybrid hard drives including both magnetic media and solid-state media. In addition to the illustrated modules and components, the data storage server 550 may further include one or more additional network interfaces, processors, data and/or power communication buses, memories, boards, chips/dies, or the like.

Media requests and transport streams may be communicated between the client 530 and the data storage server 550 over any type of wired or wireless connection (e.g., network connection). Such connection may comprise any digital or other communications network capable of transmitting messages between senders and receivers, such as any number of public or private data connections, links or networks supporting any number of communications protocols. In some embodiments, the client 530 and server 550 are configured to communicate over the Internet, for example, or any other network based upon TCP/IP or other conventional protocols, and/or over a wireless and/or wired telephone network, such as a cellular communications network for communicating with mobile phones, personal digital assistants, and/or the like. The client 530 and server 550 may further communicate over any sort of wireless or wired local area networks, such as one or more IEEE 802.3 and/or IEEE 802.11 networks.

The data storage server 550 may comprise a NAS that may be, for example, a personal in-home box, which may be accessible by the client 530 either locally (e.g., over a LAN connection) or through a cloud-based connection. The client 530 may be configured to implement a server interface application 536 configured to communicate with the data storage server 550 according to a particular application programming interface (API). For embodiments in which the client 530 is a mobile computing device (e.g., smart-phone), the server interface application 536 may be a mobile client application. The server interface application 536 may be configured to make media content item access requests incorporating various parameters, including subtitle preference parameters, as described herein. Where the client 530 is communicatively coupled to the data storage server 550 over a LAN connection, the client 530 may be configured to search for data storage server devices on a network, wherein such search may produce a list of all available devices based on, for example, IP address.

The data and/or requests communicated between the client 530 and the data storage server 550 may be implemented through a particular communication protocol that both the server interface application 536 of the client 530 and the client application interface 551 of the data storage server 550 are designed to execute. For example, in some embodiments, the client 530 and data storage server 550 communicate according to a representational state transfer (REST) application programming interface (API), or other stateless interface, which may provide desirable interoperability between the system components. The implemented API may allow for clients to utilize the file system 557 of the data storage server 550 by requesting files as network resources identified by, for example, a network address (e.g., Uniform Resource Locator (URL), Uniform Resource Identifier (URI), or the like). The requests communicated by the client 530 to the data storage server 550 may comprise, for example, HTTP requests (e.g., HTTP 1.1, HTTP/2). The media server/controller 552 may receive data and storage access commands using the client application interface 551, which may be configured to communicate with the client 530 according to the relevant API (e.g., REST API). In certain embodiments, the client 530 utilizes a DNS server in communicating with the data storage server 550; the data storage server 550 may be callable through a web address URL (Uniform Resource Locator).

The client 530 may comprise control circuitry 539 configured to implement the functionality of the illustrated modules/components. In certain embodiments, the client 530 is configured to implement a virtual file system (not shown). In some embodiments, the connection between the client 530 and the data storage server 550 may be wired, such as through Ethernet, USB, or other connection, or may be wireless, such as through WiFi, Bluetooth, or other wireless connection. In certain embodiments, the connection between the client 530 and the data storage server 550 is achieved over the Internet, wherein each of the client 530 and the data storage server 550 is connected to the Internet over a wired or wireless connection.

The data storage server 550 may be configured to implement data redundancy, wherein copies or portions of user data stored in the data storage 540 are maintained in one or more internal and/or external drives. For example, the data storage server 550 may implement redundant array of independent disks (RAID) technology, wherein the non-volatile data storage 540 includes a plurality of internal drives, disks, or other data storage partitions combined into a logical unit for the purposes of data redundancy and performance improvement. In addition, or alternatively, the data storage server 550 may be configured to implement RAID using one or more internal memory modules in combination with one or more external memory devices. Furthermore, data may be distributed across the RAID memory modules/drives according to any desirable or practical RAID level, depending on the level of redundancy and/or performance desired. For example, the data storage server 550 may be configured to implement RAID 0, RAID 1, RAID 5, RAID 10, or other RAID technology, depending on data reliability, availability, performance and/or capacity considerations or requirements.

The data storage server 550 may implement a file system 557 that may be accessible by the client 530 through the server interface application 536 for browsing and/or searching. For example, the non-volatile data storage 540 may comprise some number of fixed-size data segments of data storage (e.g., blocks). The non-volatile data storage 540 may be configured to process relatively simple data access commands, wherein such commands are received from the file server 550 over a communication interface (e.g., Integrated Drive Electronics (IDE), Small Computer System Interface (SCSI), Serial ATA (SATA), or the like). The file system 557 may implement media streams, files, file directories, and/or other data structures that represent data stored in the non-volatile data storage 540. In certain embodiments, the file system 557 maintains certain metadata (e.g., tables) for associating logical files with physical block numbers, or the like. For example, the file data 554 may comprise a file allocation table (FAT) that describes file/block associations. The file data 554 may further track unused blocks and/or allocate new blocks, as needed. In certain embodiments, the media server 552 is configured to provide a file list to the client 530 for representing to the client 530 the accessible media content items of file system that are available to the client 530.

The client 530 may comprise a server, a desktop, a laptop, a tablet, a handheld device, or the like, and includes the control circuitry 539, which may comprise one or more central processing units (CPUs), memory/data storage devices or modules, network interfaces, and/or input/output interface components, and the like. The control circuitry 539 of the client 530 may be configured to execute certain software applications for implementing the functionality described herein, such as the media player 532. The media player 532 may comprise applications that may be executable within an operating system (OS) implemented by the control circuitry 539 of the client 530. The client may one or more local storage devices (not shown), such as hard disks, flash memory modules, solid state disks, optical disks, and the like. In certain embodiments, the client 530 comprises a network interface (not shown), which may include one or more network adapters (e.g., network interface cards (NICs)), for connecting to the server 550 over a network.

The client application interface 551 may be configured to implement various API operations (e.g., REST API operations) that can be invoked by the client 530 through communication with the data storage server 550. API operations can include, for example, creation of, and/or access to, video files maintained in the non-volatile data storage 540. Each API operation can be any type of service, application, or the like that can be executed by the data storage server 550 on behalf of the client 530.

The media player 532 may be configured to send requests, as translated by the server interface application 536 for communication according to the relevant API, to the data storage server 550. The responses from the data storage server 550 may include media transport streams that may be translated by the server interface application 536 according to the API and passed to the media player 532. Storage access commands communicated by the server interface application 536 may include media content item access commands issued by the media player 532. The video access commands may specify a media content item (e.g., video file/stream) address/location and an on-demand subtitle parameter.

The media player 532 may comprise a standard media player, and may be configured to request video data using a relevant network application protocol, such as hypertext transfer protocol (HTTP), or the like, by specifying a location (e.g., uniform resource locator (URL)) of the relevant media content item. In some implementations, the media player 532 may be a web-browser media player, which may be configured to use a video element (e.g., HyperText Markup Language (HTML), HTML 5) associated with the browser to process and/or present video content. In some implementations, the media player 532 may be a mobile application for a mobile device client, such a smart phone. The media player 532 may be designed to accept a resource location (e.g., URL) that points to a media stream stored at the data storage server 550, and to play such stream.

The media player 532 may comprise one or more codecs 533, which may be configured to decode (and/or encode) media (e.g., video and/or audio) content, such as for presentation using a video interface 575 on a display 570 associated with the client 530. The codec 533 may be designed to decode data compressed in a particular format, such as H.264, H.265, MPEG-4, or the like.

The client 530 and/or other client/user may maintain video content on the non-volatile data storage 540, among possibly other types of data (e.g., audio, text, etc.). One characteristic of video files that may be relevant in certain environments is the relatively large size of some video files relative to other types of files. In view of such size, may be difficult or undesirable to upload the entire video file to the client 530 prior to initiating playback thereof. Therefore, streaming of video content may be desirable in order to improve the playback experience of the client 530. The video file 541 may be stored in the non-volatile data storage 540 in any suitable or desirable manner. For example, a user/client may provide the file for storage over a wired (e.g., USB) local connection, or over a remote or local wireless connection.

In some embodiments, computer-readable program code/media that, when executed using one or more processors of the control circuitry 539, causes the control circuitry 539 to implement the functionality of the media player 532 is stored in one or more data storage devices of the control circuitry 539 of the client 530. In some embodiments, functionality of the media player 532 is implemented exclusively in hardware.

The storage server 550 can be used to store a data stream sent to it by a host, such as the client 230 or other client/host. For example, the data storage server 550 can be configured to receive the media stream 580 and store the stream in the non-volatile data storage 540. In some embodiments, the data/stream 580 can be stored in the Moving Picture Experts Group Transport Stream (MPEG-TS) format. For example, the entire stream 580 can be stored as a single entity, which can be advantageous due to the relatively easy storage and retrieval thereof. However, such a process generally results in uniform data characteristics (e.g., endurance) across the entire spectrum of data of the stream 580. Therefore, storage of one or more elementary streams associated with the media stream 580, such as the new subtitle file/stream 590, in a separate block/region of the non-volatile data storage 540 can be advantageous. For example, with respect to the subtitle file/stream 590, such portion of the data associated with the media stream 580 may only be required to be stored for a period of time. According to some implementations in which the new subtitle data/stream is stored together with the media stream 580 (e.g., as a subtitle elementary stream 588 or superimposed on the frames of the video stream 582), in order to remove the new subtitle file/stream 590 after it becomes unnecessary, it may be necessary for the entire data stream 580 to be read from memory, wherein the unnecessary video frames and/or elementary stream(s) is/are removed, and the resulting new stream is stored back in memory, which may be an inefficient process that reduces performance and increases write amplification. Further, the frames/stream(s) that will be removed are stored with the same endurance and protection parameters as those that will be kept. The same issue can be present with different packet identifiers.

In some embodiments, the subtitle file/data 590 is stored in the memory 540 of the storage system/server 550 using different storage options relative to the media stream 580. This addresses the problem mentioned above where storing the MPEG-TS data as a single stream with the new subtitle data creates throughput issues when the data is phased out after a period of time. Such separate storage can also be performed on different elementary streams or packet identifiers (PIDs), which are the data that identifies each table or elementary stream in a transport stream.

The following paragraphs provide examples in which the data stream is in the MPEG transport stream (MPEG-TS, MTS, or simply "transport stream") format specified in the MPEG-2 protocol. It should be understood that this is merely an example, and other types of formats, frame types, and storage options can be used. MPEG-TS is a standard digital container format for transmission and storage of audio, video, and Program and System Information Protocol (PSIP) data. It is used in broadcast systems such as Digital Video Broadcasting (DVB), Advanced Television Systems Committee (ATSC) and Internet Protocol television (IPTV). Generally, a transport stream is a container format encapsulating packetized elementary streams, which may include error-correction and synchronization pattern features for maintaining transmission integrity when the communication channel carrying the stream is degraded. References herein to transport streams may refer to program streams, which streams designed for reasonably reliable media, such as discs (like DVDs), whereas transport streams are designed for less reliable transmission, namely terrestrial or satellite broadcast. A transport stream may carry multiple programs.

Transport streams, like the transport stream 585 transmitted from the data storage server 550 to the client 530 including the on-demand subtitle data/file 590, can encapsulate a number of substreams, such as packetized elementary streams (PESs) which in turn wrap the main data stream using the MPEG codec or any number of non-MPEG codecs (such as Dolby Digital (AC-3) or Digital Theater Systems (DTS) audio, and Motion JPEG (MJPEG) or JPEG 2000 video), text and pictures for subtitles, tables identifying the streams, and even broadcaster-specific information such as an electronic program guide. Many streams can be mixed together in some cases. Generally, each transport stream may be comprised of (at most) 188-byte sections that are interleaved together. For example, the transport stream 585 can comprise a plurality of sequenced network packets. Such packets can include a sync byte and a header, that may be followed with optional additional headers, wherein the rest of the packet consists of payload data. The packets may be up to 188 bytes in length, but the communication medium may add additional information. The packet payload can include header and payload data for various packetized elementary streams (PES's), such as the video stream 582, audio stream 583, native subtitle stream 586, and/or new subtitle stream 588.

With further reference to the media stream 580, depending on the type of container, the video stream 582 may be represented in any of a variety of possible formats. For example, the media stream 580 may comprise a single video stream, an advanced audio coding (AAC) audio stream and/or a dedicated-to-sound (DTS) audio stream, as well as subtitle streams in one or more languages. The video stream component of the client codec 533 and/or decoder 557 of the data storage server 550 codec may be any suitable or desirable codec, such as H.264, or the like. The audio stream component of such modules may be MP3, AAC, AC-3, or the like.

The user I/O module 537 may provide an interface for communicating with a user using one or more I/O components, such as the display 570 and/or one or more user input device interfaces (e.g., mouse, keyboard, touchscreen, or the like). The user I/O module 537 may provide the video interface 575 for viewing, by the user, certain video content and/or subtitles 599 (e.g., on-demand subtitles).

The media player 532 may be configured to display the new subtitles 599 in the video interface 575 by displaying video frames that have the new subtitles superimposed thereon. For example, the data storage server 550 may provide the video stream with video frames having the new subtitles superimposed thereon. Alternatively, the media player 532 may be configured to display the new subtitles 599 by reading and displaying the subtitle text 592 in a time-synchronized fashion in the video interface 575 over the respective video frames.

The transcriber 555 of the data storage server 550 may be configured to implement conversion of audio data to text data. The transcriber 555 may comprise hardware for hardware transcribing, which may free-up processor and/or other resources relative to exclusively-software-implemented transcribing embodiments. In certain embodiments, the transcriber 555 may comprise hardware that is a component of a system on a chip (SOC) of the data storage server 550, wherein the SOC comprises some or all of the control circuitry of the media server 552. In certain embodiments, the transcriber 555 comprises software code/firmware for implementing transcribing functionality and/or interacting with hardware transcoder component(s).

With respect to on-demand subtitle generation, the client 530 may provide a request including one or more of a file name or other identifier, desired video content resolution, and/or desired bit rate, as well as possibly including on-demand subtitle preference/request, over the connection between the client 530 and the file server 552. The file server 552 may provide the audio stream 583 of the requested media stream 580 to the subtitle management circuitry 553, which may produce an output stream 585 and provide the same to the client application interface 551, which forwards the responsive transport stream 585 to the client 530 in accordance with the relevant API. In certain embodiments, the media server 552 provides the newly-generated subtitle text together with the associated video stream frames dynamically as the bytes of the subtitle text are generated by the transcriber 555. Therefore, if a user provides seeking input while playing the media stream, the new subtitles associated with the requested byte may not have been transcribed by the transcriber 555 at that point in time. Therefore, such seeking may introduce some amount of latency in some implementations to allow the subtitle manager 553 time to generate the desired subtitles.

The client 530 (e.g. media player 532) may be configured to receive and/or provide user preference data relating to on-demand subtitle preferences/settings requested in connection with a particular media content item, such as the media stream 580 stored in the nonvolatile data storage 540 of the data storage server 550. The media server/controller 552 may be configured to decode an audio stream or other audio data 583 of the requested media stream 580, which may be present in, for example, an audio PID/stream of the media stream 580, wherein the media server/controller 552 of the data storage device/server 550 is configured to internally perform audio-to-text conversion from the decoded audio data using the transcriber/speech-recognition circuitry 555. The transcriber 555 may use any suitable or desirable speech recognition model. Such speech recognition model may be updated when required, such as by the client 530 and/or media server 552, to perform desired speech-to-text functionality.

The media server/controller 552 may be configured to use the resulting subtitle text generated by the transcriber circuitry 555 to create a separate/new subtitle file 590, which may be embodied in any suitable or desirable data structure or protocol. For example, subtitle files generated in connection with embodiments of the present disclosure may comprise SubRip subtitle (SRT) files. The subtitle file 590 generated by the media server/controller 552 may be appended to the stored native media stream 580, and/or may be stored separately in a separate block or group of the nonvolatile data storage 540 from the native media stream 580. The new subtitle stream 588 is illustrated as an example appended subtitle stream appended to the native media stream 580. The new subtitle stream 588 may be appended in addition to, or in place of, one or more native subtitle streams 586, which may be pre-generated subtitle streams provided and stored with the native media stream 580 prior to the on-demand subtitle request from the client 530.

The file server 552, and in particular the subtitle management 553 portion of the control circuitry of the file server 552, includes decoder circuitry 557. The decoder circuitry 557 may be configured to decode audio and/or video data, such as the audio stream 583 of the native media transport stream 580 stored in the nonvolatile data storage 540. The subtitle management circuitry 553 further comprises the transcriber circuitry 555, which may be configured to receive as input audio data, such as the audio stream 583 of the native media transport stream 580 and convert the audio data to text data. That is, the transcriber 555 may provide speech-to-text conversion/transcription functionality. The media server 552 may be configured to retrieve the audio stream 583 and transcribe the audio stream to generate the subtitle text data 592.

The data storage server 550 can receive an on-demand subtitle request with necessary configuration data from the client 530. In turn, the data storage server 550 can decode the audio stream 583 of the corresponding stored transport media 580, which may be used as input to the transcriber module 555.

The subtitle manager circuitry 553 may be configured to generate new subtitle files, such as the new subtitle file 590, based at least in part on certain data stream(s) (e.g., elementary data stream(s)) of a native media transport stream. The media server 552 may receive a command from the client 532 to access the native media stream 580, which may represent a video file and/or other media file. The media server 252 may further receive, as part of the media request/access command, or as part of a separate command from the client 530, preference data for on-demand subtitles of a specified language and/or having certain parameters. In response, the media server 552 may retrieve the native media stream 580 from the nonvolatile data storage 540 and extract/retrieve the audio stream 583 therefrom. The audio stream 583 may be provided to the transcriber circuitry 555 to generate subtitle text corresponding to the audio data of the audio stream 583. In order to transcribe the audio data, the subtitle manager 553 may first decode the audio stream 583 using the decoder circuitry 557. The subtitle management circuitry 553 may further be configured to generate the new subtitle file 590 based at least in part on the subtitle text data generated by the transcriber 555. For example, the subtitle manager 553 may construct the new subtitle file 590 according to the SubRip Subtitle (SRT) standard. The new subtitle file 590 may include a header 593, as well as a payload including the subtitle text 592 and certain timestamp data 591 relevant for synchronizing the subtitle data 592 with video frames of the video stream 582. In some embodiments, the media stream 580 includes timestamp/synchronization data for synchronizing the frames of the video stream 582 with the audio stream 583 data; the timestamp data 591 of the new subtitle file 590 can indicate temporal relationships with the timestamp/synchronization data indicating temporal relationships between the video stream 582 and the audio stream. The video stream may be time-synched to the audio stream to provide lip synchronization. The timestamp data 591 may likewise synchronize the subtitle data 592 to the video frames of the video stream 582 the video itself is synchronized to audio for lip synchronization as following—relevant for synchronizing the subtitle data 592 with video frames of the video stream 582, the video itself is typically synchronized to audio frames Use of SRT file standard may be desirable to provide Moving Picture Experts Group (MPEG) compatibility. The newly-created subtitle file 590 can be stored in the nonvolatile data storage 540 and integrated into the native media stream 580. Generally, the new subtitle file 590, such as an SRT file, may comprise the subtitle text 592 and the corresponding timestamp data 591 for audio presentation as the payload of the file 590. The new subtitle file 590 can be added to the existing elementary stream or treated as a separate program, which the graphical layer of the media player 532 can superimpose on the respective video frames. That is, the subtitle management circuitry 553 may be configured to superimpose the newly-generated subtitle text onto the video stream 582 of the native media stream 580, such that video frames thereof include new superimposed subtitle text corresponding to the video frame timestamp.

After generating the new subtitle file 590, the media server 552 may be configured to append the subtitle file 590 and or subtitle text 592 to the native media stream 580, as indicated by the optional presence of the new subtitle stream 588 as part of the media stream 580. In some embodiments, the media server 552 may store the new subtitle file 590 separately from the native media stream 580. For example, the new subtitle file 590 may be stored in a separate area, region, block, and/or other type of partition from the native media stream 580.

Storage of the new subtitle file 590 separately from the native media stream 580 can provide certain technological benefits and advantages. For example, according to some implementations, the new subtitle file 590 may be stored in a temporary storage area that may be garbage-collected separately from the region 548 of data storage in which the native media stream 580 is stored. For example, in some implementations, the subtitle file 590 may be saved in a separate flash block from the native media stream 580, thereby allowing for garbage collection of the flash block 546 in which the new subtitle file 590 is stored separately from the flash block 548 in which the native media stream 580 is stored. That is, the native media stream 580 and the new subtitle file 590 may be associated with blocks or other partitions of data storage media that have different endurance characteristics. Therefore, if the new subtitle file 590 is no longer needed, erasure of the block of storage 546 storing the new subtitle file 590 may be performed, thereby freeing up data storage space for other uses, without erasing or garbage-collecting the block 548 storing the native media stream 580.

Generally, it may be undesirable to store subtitle data in a separate block/region of storage from a media stream with which it is associated, as such implementation would require a separate retrieval of the subtitle data in addition to the retrieval of the media stream, as well as maintenance of mapping information indicating the connection between the media and subtitle files, thereby potentially negatively impacting media access/provision efficiency. However, embodiments of the present disclosure may be implemented in spite of such inefficiencies in order to improve efficiency relating to garbage collection, wear leveling, and/or other data storage maintenance operation(s). For example, garbage collection technology improvement through the use of separately-stored on-demand subtitle files can provide improved operational efficiency and data storage availability for the data storage server 550, such as by freeing up data storage space. Garbage collection generally involves moving certain valid data from various blocks/regions of the non-volatile data storage 540 to purge such blocks of valid data and thereby allow for the erasure/reuse of the blocks. This is due to the necessity of blocks of, for example, NAND flash memory to be erased in their entirety. When the new subtitle file 590 is stored in another block of the non-volatile data storage 540 separate from the native media stream 580, if the subtitle file 590 becomes no longer needed, the block in which the subtitle file is stored can be erased once any other valid data in the block has been moved, without the necessity of moving the new subtitle file 590 or the native media stream 580. Alternatively, if the new subtitle stream 588 were stored as an elementary stream of the native media stream 580, together in the block/region 548 of the data storage in which the media stream 580 is stored, it may not be practical or desirable to erase the block/region 548 once the subtitles become outdated or stale without transferring data of the native media stream 580 to another block/region. Therefore, embodiments of the present disclosure can reduce the workload of the data storage server 550.

At the client 530, after receiving the media stream 580 and the new subtitle file 590, which may be transmitted separately, or as a common transport stream 585, the media player application 532 may decode the media stream 580 and the new subtitle file 590 and display video frames 573 associated therewith in a video interface window 575. The media player 532 may further display the new subtitles 599 based on the subtitle text 592 in the video interface 575. In some embodiments, the new subtitles 599 may be part of the decoded video stream received by the client 530 or may be added by the media player 532 and superimposed over the video frame 573 using the new subtitle file 590. The timestamp data 591 may be used to govern when certain text of the subtitle text 592 is displayed to ensure that the subtitles correspond to the correct times/frame of the video media.

The data storage server/device 550 can send the resulting transport stream 585 on-demand to the client 530, wherein the transport stream 585 includes the newly-generated subtitle file 590 and/or subtitle text 592. In some implementations, the subtitle text 592 may be superimposed on video frames of the video stream 582 of the media stream 580 in addition to, or rather than, sending as a separate subtitle file. That is, the video frames of the video stream 582 may have superimposed thereon relevant lines of text of subtitle corresponding thereto in a time-synced manner. The provision by the data storage server 550 of on-demand subtitle content can advantageously enhance the user experience by increasing the subtitle viewing options for a media content item. On-demand subtitle provision and generation in accordance with embodiments of the present disclosure further provides technological improvement to media storage, request, and presentation technologies, as described in detail herein.

As shown, the data storage server 550 is configured to internally generate the on-demand subtitles and provide the same together with the media stream 580, thereby obviating the need to transfer the media stream 580 to the client 530 prior to the generation of the on-demand subtitles.

Once the text subtitles have been generated by the subtitle manager 653, the subtitle manager 653 may be configured to generate a subtitle file incorporating the subtitle text, as well as certain timestamp and/or other temporal data. The media may be attached to the subtitle text or file in any suitable or desirable manner. For example, the native/legacy media stream 580 includes one or more video 582 and audio 583 streams. When the new subtitle text/stream 588 is created, it is desirable for the subtitles to be temporally synchronized with the video and audio streams. The new subtitle stream 588 includes timestamp data allowing for synchronization with the program clock associated with the video 582 and/or audio 583 streams. In some implementations, the media server 552 and/or subtitle management circuitry 553 is configured to superimpose lines of text of the newly-generated subtitle stream (e.g., 588, 592) onto respective time-synchronized video frames of the video stream 582 in a graphical manner. That is, according to some implementations, video frames of the video stream 582 may be modified to have respective lines of text superimposed thereon, such that the video frames include the newly-generated subtitle text generated on-demand by the media server/controller 551. The transport stream 585 transmitted to the client 530 may therefore include the media stream 580 with the modified video stream 582 having the new subtitles superimposed thereon, wherein the media stream 580 may be transported with or without a separate subtitle file 590.

With the video stream 582 modified to include superimposed subtitle information thereon, the media player 532 may not need to play a separate subtitle stream, but rather simply plays the video stream, which presently includes the new on-demand subtitles integrated with the video frames thereof. In some embodiments, the modified video stream may be modified and stored/copied in/to a temporary storage (e.g., volatile memory) of the data storage server 552 without the native media stream 580 stored in the non-volatile data storage 540 being modified. For example, in response to the on-demand subtitle request and/or media content request from the client 530, the media server/controller 552 may retrieve the native media stream 580 from the non-volatile data storage and copy/buffer the media stream 580 in temporary storage. With the media stream buffered to/in temporary storage, the subtitle management circuitry 553 may access the audio stream 583, generate new subtitles based thereon using the transcriber circuitry 555, and superimpose the new subtitles on the video frames of the temporary copy of the video stream 582. For example, the subtitle management circuitry 553 may access the video stream, generate new video frames representing copies of the original video frames but with the new subtitles superimposed thereon, and overwrite/modify the video stream to include the newly-generated video frames with the subtitles superimposed thereon.

As an alternative to superimposing the new subtitles on the video stream 582, the transport stream 585 may include the original video stream 582 as part of the media stream 580, wherein the new subtitle file 590 may be played by the media player 532 with the video and audio streams to produce the on-demand subtitles in the graphical layer of the media presentation.

According to some use cases, the client 530 may be permitted to configure the language of interest for the requested on-demand subtitles. A known language conversion model of the transcriber 555, which is internal to the data storage server 550, can insert the new subtitle stream in response to the requested subtitle language rather than the native subtitle stream 586. Such embodiments can allow the user to use any media, without language restriction, through in-house storage device options provided by the data storage server 550.

Figure 6:
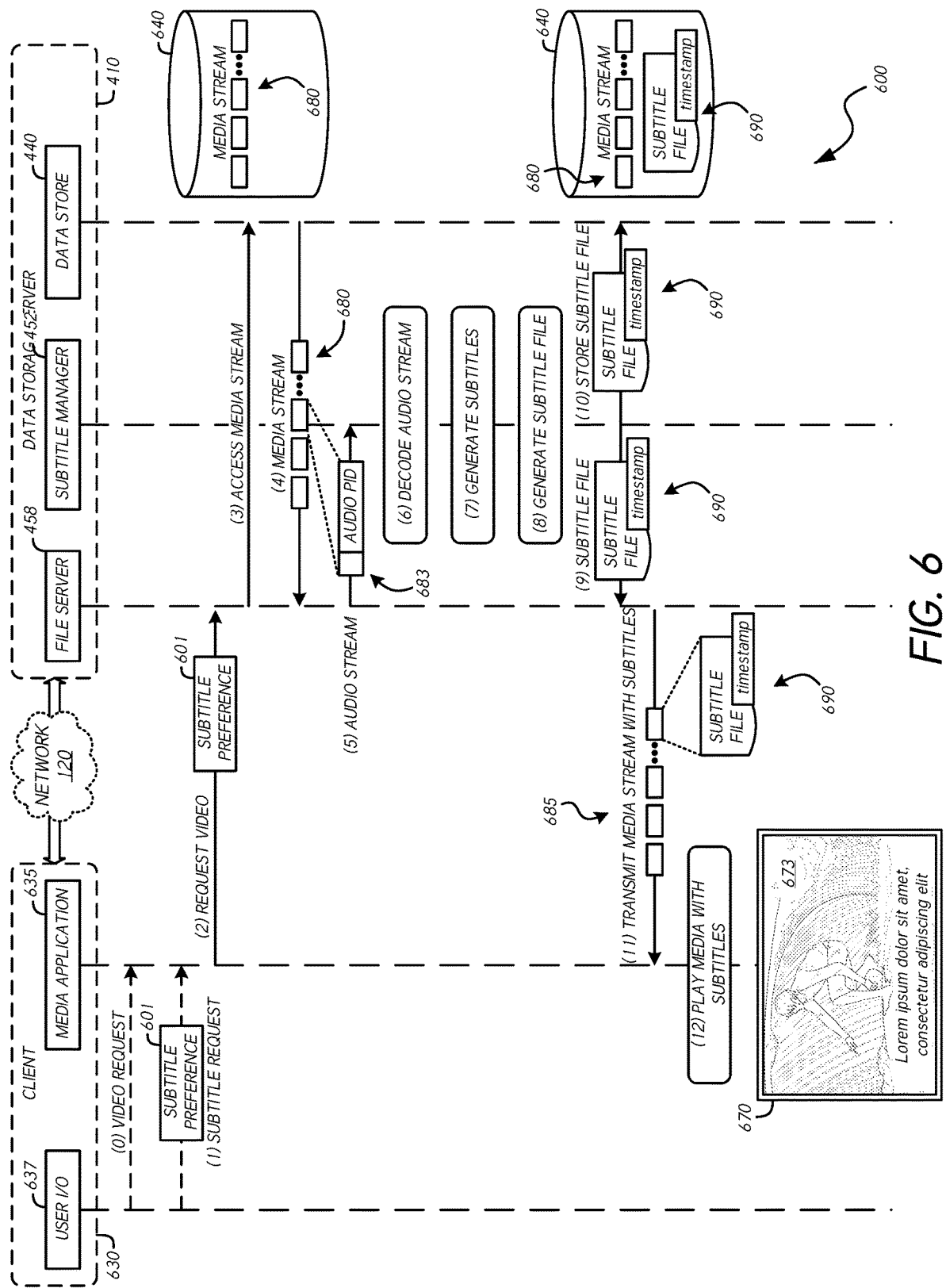
FIG. 6 illustrates a sequence diagram for implementing on-demand subtitle provision in accordance with one or more embodiments.

FIG. 6 illustrates a sequence diagram for implementing on-demand subtitle generation and provision in accordance with one or more embodiments of the present disclosure. The process illustrated in FIG. 6 may allow for on-demand subtitle requests and generation by a data storage server 650. The process 600 of FIG. 6 may involve or be implemented using a network-attached data storage device/server, or other type of data storage server. The data storage server 650 may be configured to provide in-storage subtitle creation in response to on-demand user preferences associated with the client 630 and/or user.

At operation (0), the process 600 involves receiving, using user input/output circuitry or other means 637, a request to use/access a media file/stream 680. For example, the media application 635 may receive the request. In some implementations, certain subtitle preferences 601 may be determined by the media application 635 of the client system 630 in some manner. For example, in some embodiments, the subtitle preference data 601 may be received using the user I/O circuitry/means 637. The user I/O means 637 may comprise one or more keyboard, mouse, touchscreen, or audible command devices. In some embodiments, the media application 635 may access stored/known subtitle preference information relating to a particular user. Generally, the subtitle preference data 601 may indicate an on-demand subtitle generation request for a version of the requested media content having associated therewith viewable subtitles of a particular language and/or having one or more other desired characteristics. The subtitle preference data 601 may be provided to the media application 635 at operation (1).

At operation (2), the process 600 involves requesting, by the media application 635, a media stream 680 corresponding to the user media request to a data storage server 650, such as a network attached storage systems/devices, as described in detail herein. In some implementations, the request from the media application 635 to the data storage server 650 may include the desired on-demand subtitle preferences 601. In some implementations, the subtitle preference data 601 may be provided by the media application 635 as a separate request from the media file/stream request. In some implementations, the request at operation (2) is implemented as a data structure/packet including a region or field configured or utilized to store subtitle preference data.

An interface may be provided/displayed to the user to allow the user to engage with the media application 635 and/or data storage server 650 and provide subtitle option selection for the user. For example, the interface may allow for the user to select among a plurality of available languages corresponding to the transcribing functionality of the data storage server 650 and/or subtitle manager 653 thereof. The client 630 may include a storage driver that converts the user input to a specific command.

At operation (3), the media/file server 652 of the data storage server 650 accesses the requested media stream 680 from a nonvolatile data store 640 of the data storage server 650. At operation (4), the media stream 680 is transferred from the data store 640 to certain memory, such as volatile memory, of the data storage server 650, which may be used to buffer the media stream 680 for at least a portion of time. That is, the data storage server 650 (e.g., NAS device/system) performs data retrieval from the data store 640 internally. In some cases, the media stream 680 includes multiple audio streams, such as audio streams corresponding to multiple different languages, wherein the media server 652 is configured to select an audio stream 683 of the media stream 680 that the subtitle manager 653 is equipped to process for text-generation purposes.

At operation (5), the process 600 involves extracting or otherwise accessing one or more audio streams 683 of the media stream 680. For example, the audio stream(s) 683 may be provided to a functional subtitle manager module or circuitry 653. The subtitle manager circuitry 553 may be configured to decode the audio stream 683, as indicated at operation (6), and generate text subtitles using speech-to-text functional circuitry, as indicated as operation (7). At operation (8), the process 600 can involve generating, by the subtitle manger 653, a new subtitle file 690 including the newly-generated subtitle text and/or certain timestamp data for use in temporal synchronization of the new subtitle text with the frame(s) of the associated video stream.

In some implementations, as shown as operation (10), the subtitle manager 653 may be configured to store the new subtitle file 690 in the nonvolatile data store 640. For example, subtitle file 690 may be stored separately from the native media stream 680 with which it is associated. Storage of the subtitle file 690 in a separate flash block from the native media stream 680 may allow for application of different endurance-related parameters and/or actions to the subtitle file 690 than is/are applied to the media stream 680.

When the newly-generated subtitle file 690 is stored separately in a separate storage region from the media stream 680, the subtitle file 690 may be appended to the media stream 680 and played only in response to an on-demand request for subtitle creation/provision from the user/client. Storing the subtitle file 690 in a separate region, such as a different namespace, from the media stream 680 can enable the data storage server to phase the subtitle file 690 relatively easily when it is determined by the data storage server 650 that the subtitle file 690 is no longer required. That is, storage of the subtitle file 690 in a separate region or namespace can improve garbage collection efficiency for the data storage server 650 with respect to the region, block, or namespace in which the subtitle file 690 is stored.

The media server 652 of the data storage server 650 may be configured to transmit a media transport stream 685 including the video data of the media stream 680, as well as the new subtitle file 690, which includes relevant timestamp/temporal information associated with the newly-generated subtitle text. The media application 635 may be configured to play the video stream of the transport stream 685 on a display 670 along with time-synched portions 699 of the new subtitle text data included in the subtitle file 690.

By performing the subtitle generation at the data storage server 650, the process 600 of FIG. 6 allows for on-demand subtitle generation without requiring the media stream 680 to be transferred from the data storage server 650 to the client 630 for generation of the subtitles. That is, the data source server 650 is configured to internally implement the subtitle-generation functionality and provide the packaged data stream 685 including with the newly-generated subtitles 690 together with the media stream 680.

Figure 7:
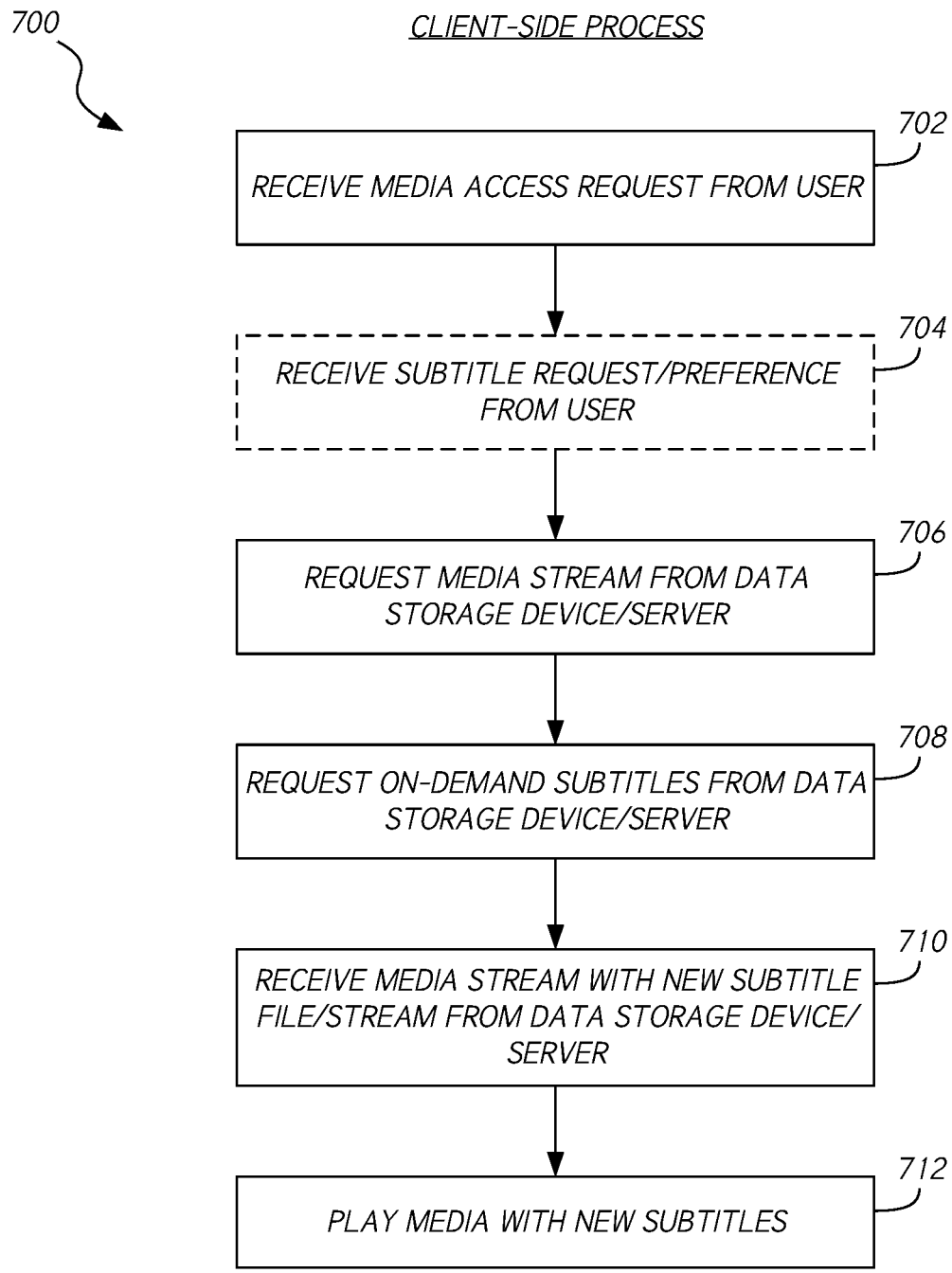
FIG. 7 is a flow diagram illustrating a process for obtaining on-demand subtitles for a media content item in accordance with one or more embodiments.

FIG. 7 is a flow diagram illustrating a process 700 for client-side on-demand subtitle request and acquisition in accordance with one or more embodiments of the present disclosure.

At block 702, the process 700 involves receiving a media access request from a user. For example, the media access request may be received using certain user input/output circuitry of the client system. In some embodiments, the client may be configured to present one or more interfaces to the user that allow for selection by the user of certain media items. Such interfaces may further allow for input of on-demand subtitle requests from the user.

The operation(s) associated with block 704, which may or may not be implemented as part of the process 700, involve receiving a subtitle request or preference from the user using the user input/output circuitry. The determination or receipt of subtitle request/preference information from the user may temporally occur prior to receiving the media access request at block 702. For example, in some implementations, the user may create a profile indicating certain subtitle preferences and/or such preferences may be determined/derived by the client from behavioral analysis relating to the user. For example, the client may be configured to determine language usage/preferences of the user based on media selections and/or other behavioral actions of the user vis-à-vis interactions with the client and/or interactions with one or more other systems, wherein information relating to such interactions is provided to or otherwise known by the client.

At block 706, the process 700 involves requesting the selected media stream from a data storage server communicatively coupled to the client. For example, the data storage server may comprise one or more devices or systems, such as a network-attached storage drive. At block 708, the process 700 further involves requesting on-demand subtitles from the data storage device/server, wherein such subtitle request may be incorporated in the request associated with block 706. For example, the request associated with block 706 may involve the transmission of a data packet including one or more fields or data structures indicating subtitle preferences/requests.

At block 710, the process 700 involves receiving from the data storage server the requested media stream along with a new subtitle file/stream generated by the data storage server/device in response to the request(s) associated with block(s) 706 and/or 708. In some implementations, the media stream may include a video stream having the newly-generated subtitles superimposed on video frames thereof rather than, or in addition to, being included in a separate subtitle file. In some implementations, the newly-generated subtitle text is appended to the native media stream associated with the selected/requested media content item.

At block 712, the process 700 involves playing the received media with the new subtitles, wherein temporal presentation of the subtitles may be in accordance with certain timestamp/temporal information incorporated in the new subtitle file received from the data storage server.

Figure 8:
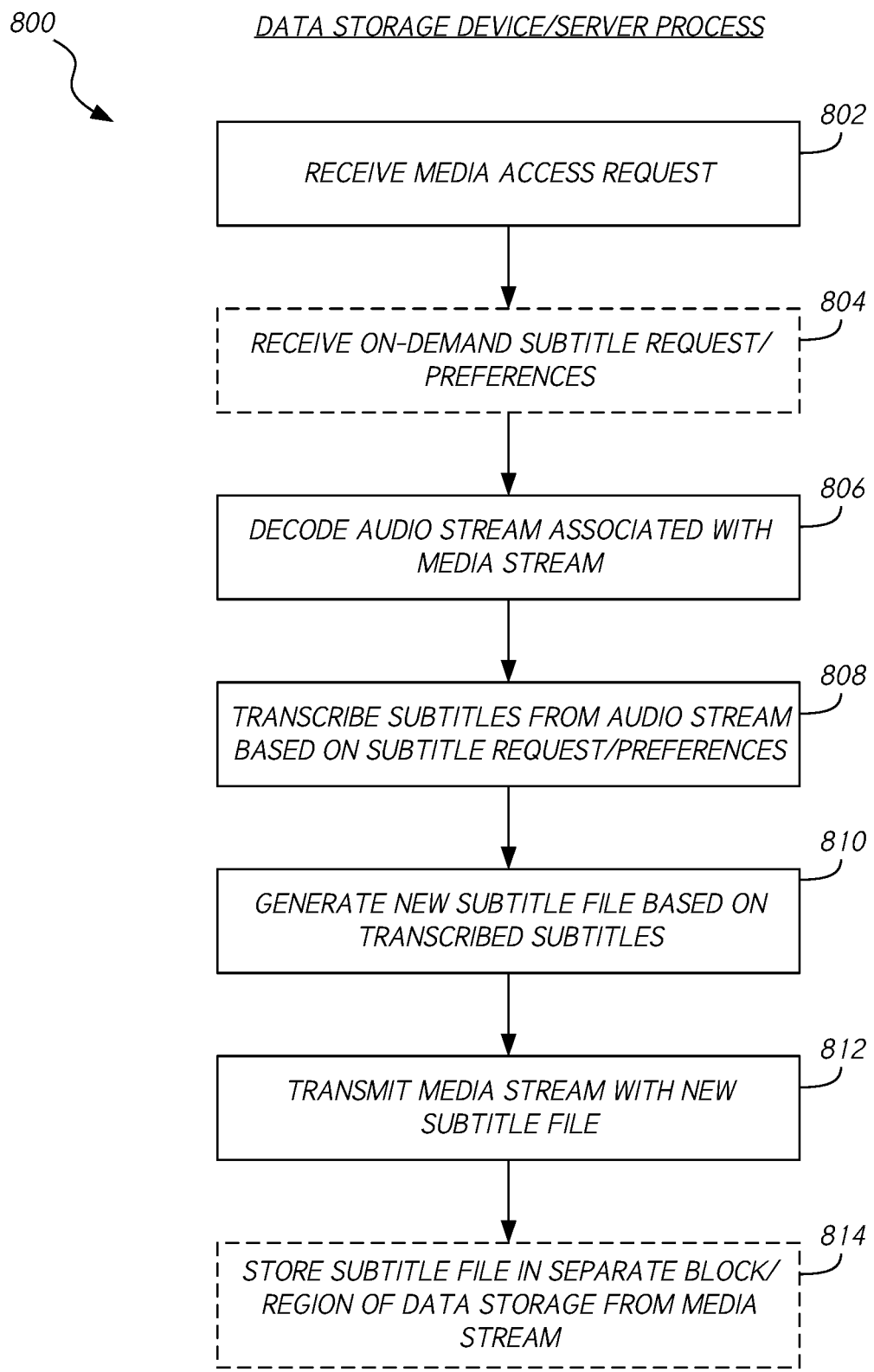
FIG. 8 is a flow diagram illustrating a process for generating and providing subtitles for a media content item in accordance with one or more embodiments.

FIG. 8 is a flow diagram illustrating a process 800 for on-demand subtitle generation and provision by a data storage server/device in accordance with one or more embodiments of the present disclosure.

At block 802, the process 800 involves receiving a media access request from a client device or system, wherein the media access request indicates a desired media content item. In some implementations, the process further involves receiving, either with the request associated with block 802 or other separate request from the client, certain on-demand subtitle preferences/request from the client. In some implementations, the on-demand subtitle preferences of the user/client may be determined by the data storage server independent of a present request therefor. For example, the data storage device/server may be configured to determine subtitle preferences of the user/client based on user profile data maintained by the data storage server/device. Such subtitle preference profile data may be received from or set by the client or otherwise obtained/determined by the data storage device/server.

At block 806, the process 800 involves decoding one or more audio streams associated with the requested media content item, which may be retrieved from a nonvolatile data store of the data storage device/server. That is, the data storage server/device may decode the audio corresponding to the subtitle request.

At block 808, the process 800 involves transcribing the audio stream(s) to generate subtitles in accordance with the on-demand subtitle preferences of the client/user. The data storage device/server can perform speech-to-text conversion according to language preferences specified by the request from the client.

At block 810, the process 800 involves generating a new subtitle file based on the transcribed subtitles associated with the operation at block 808. For example, the operation of block 808 may produce certain subtitle text data, which may be incorporated in the new subtitle file. Furthermore, the new subtitle file may have appended thereto and/or otherwise incorporated therewith certain timestamp or other temporal data associating respective lines of text of the new subtitle text with presentation times relating to video frame times of the associated video stream.

At block 812, the process 800 involves transmitting the native media stream, including the relevant video and audio streams thereof, as well as the new subtitle file, to the client. The process 800 may further comprise, at block 814, storing the subtitle file including relevant timestamps. In some embodiments, the subtitle file is stored in a different endurance group of the nonvolatile data storage relative to the endurance group in which the native media stream associated with the newly-generated subtitle file is stored.

Additional Embodiments

Those skilled in the art will appreciate that in some embodiments, other types of video file seeking and/or live transcoding systems can be implemented while remaining within the scope of the present disclosure. In addition, the actual steps taken in the processes discussed herein may differ from those described or shown in the Figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the Figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A home network-attached storage device (NAS) for adding on-demand subtitles to one or more media files stored on the NAS and provided to a client on a local area network (LAN), the NAS comprising:
a non-volatile memory module configured to store, in a first storage area, a media stream including an elemental video stream and an elemental audio stream;
a network interface; and
control circuitry coupled to the non-volatile memory module and to the network interface, the control circuitry including transcriber circuitry for converting audio to text, the control circuitry configured to:
connect to a client over a LAN connection using the network interface;
receive a request for the media stream from the client;
in response to the request for the media stream:
determine subtitle preferences associated with the request for the media stream;
access the elemental audio stream associated with the media stream;
convert, using the transcriber circuitry, the elemental audio stream to subtitle text data representing a transcription of at least a portion of the elemental audio stream;
generate for a first language, on-demand, a new subtitle file including the subtitle text data in accordance with the subtitle preferences; and
save the subtitle file to a temporary storage area in the NAS that is separate from the first storage area, wherein the temporary storage area is erased after use of the subtitle file such that no subtitle file for the first language remains; and
send a transport stream to the client over the LAN connection, the transport stream including the media stream and the subtitle file.

2. The NAS of claim 1, wherein the subtitle file includes:
a header;
the subtitle text data; and
timestamp data associated with the subtitle text data.

3. The NAS of claim 1, wherein the transport stream includes the subtitle file separate from the elemental video stream and the elemental audio stream of the media stream.

4. The NAS of claim 1, wherein, in the transport stream, the subtitle file is separate from a native subtitle stream of the media stream.

5. The NAS of claim 1, wherein, in the transport stream, the subtitle file is part of the media stream.

6. The NAS of claim 1, wherein the subtitle file is a SubRip Subtitle (SRT) file.

7. The NAS of claim 1, wherein:
the non-volatile memory module includes a first region having a first endurance designation;
the first region is configured to store the media stream; and
the control circuitry is further configured to store the subtitle file in a second region of the non-volatile memory module, the second region having a second endurance designation that is different from the first endurance designation.

8. The NAS of claim 7, wherein:
the first region corresponds to a first namespace; and
the second region corresponds to a second namespace.

9. The NAS of claim 1, wherein the control circuitry is further configured to append the subtitle text data to the media stream.

10. The NAS of claim 1, wherein the media stream includes a native subtitle stream.

11. The NAS of claim 10, wherein the control circuitry is further configured to add the subtitle text data to the native subtitle stream.

12. A method of generating on-demand subtitles on a home network-attached storage device (NAS) connected, via a local area network (LAN), to a client, the method comprising:
receiving a request for a media stream stored in a first storage area of a non-volatile data store, the media stream including an elemental video stream and an elemental audio stream;
receiving an on-demand subtitle request associated with the request for the media stream;
in response to the on-demand subtitle request:
retrieving, from the non-volatile data store, the elemental audio stream associated with the media stream;
converting, using transcriber circuitry of the NAS, the elemental audio stream to subtitle text data;
generating for a first language, on-demand, a new subtitle file including the subtitle text data; and
saving the subtitle file to a temporary storage area in the NAS that is separate from the first storage area, wherein the temporary storage area is erased after use of the subtitle file such that no subtitle file for the first language remains;
retrieving, from the non-volatile data store, the media stream; and
transmitting a transport stream including the media stream and the subtitle file.

13. The method of claim 12, wherein the subtitle file includes a header, the subtitle text data, and timestamp data associated with the subtitle text data.

14. The method of claim 13, wherein the transport stream includes the subtitle file separate from the media stream.

15. The method of claim 13, further comprising storing the subtitle file in the non-volatile data store.

16. The method of claim 15, wherein the subtitle file is stored in a separate region of the non-volatile data store than the media stream.

17. The method of claim 15, further comprising garbage collecting the subtitle file without garbage collecting the media stream.

18. A data storage device for adding on-demand subtitles to one or more media files stored on the data storage device and provided to a client on a local area network (LAN), the data storage device comprising:
non-volatile data storage media configured to store, in a first storage area, a media stream including an elemental video stream and an elemental audio stream;
means for communicatively coupling locally, via the LAN, to a host system; and
controller means coupled to the non-volatile data storage media and to the means for communicatively coupling, wherein the controller means is configured to:
receive a request for the media stream from the host system using the means for communicatively coupling;
receive an on-demand subtitle request associated with the request for the media stream;
in response to the on-demand subtitle request:
access the elemental audio stream of the media stream;
using a means for transcribing audio data, convert the elemental audio stream to subtitle text data representing a transcription of at least a portion of the elemental audio stream;
generate for a first language, on-demand, a new subtitle file including the subtitle text data; and
save the subtitle file to a temporary storage area in the data storage device that is separate from the first storage area, wherein the temporary storage area is erased after use of the subtitle file such that no subtitle file for the first language remains; and
transmit a transport stream to the host system, the transport stream including the media stream and the subtitle file.

19. The data storage device of claim 18, wherein the subtitle file includes a header and timestamp data associated with the subtitle text data.

20. The data storage device of claim 19, wherein the controller means is further configured to store the subtitle file in a region of the non-volatile data storage media separate from the media stream.

* * * * *